United States Patent [19]

Engel

[11] 4,120,703

[45] Oct. 17, 1978

[54] METHOD AND APPARATUS FOR REDUCING SMOKE AND PREVENTING SECONDARY FINS DURING SCARFING

[75] Inventor: Stephen August Engel, Shenorock, N.Y.

[73] Assignee: Union Carbide Corporation, New York, N.Y.

[21] Appl. No.: 828,204

[22] Filed: Aug. 26, 1977

Related U.S. Application Data

[63] Continuation-in-part of Ser. No. 608,987, Aug. 29, 1975, abandoned.

[51] Int. Cl.² ............................................. B23K 7/06
[52] U.S. Cl. ...................................... 148/9.5; 266/49; 266/51
[58] Field of Search ...................... 148/9.5; 266/49, 51

[56] References Cited

U.S. PATENT DOCUMENTS

| 2,218,141 | 10/1940 | Adams et al. | 266/49 |
|---|---|---|---|
| 2,284,574 | 5/1942 | Jacobsson et al. | 266/49 |
| 2,465,297 | 3/1949 | Thompson et al. | 148/9.5 |
| 2,664,368 | 12/1953 | Babcock et al. | 148/9.5 |
| 2,754,234 | 7/1956 | Holub et al. | 148/9.5 |
| 2,873,224 | 2/1959 | Thompson et al. | 148/9.5 |
| 3,035,947 | 5/1962 | Milton et al. | 148/9.5 |
| 3,163,559 | 12/1964 | Thompson et al. | 148/9.5 |
| 3,354,002 | 11/1957 | Gingerich et al. | 148/9.5 |
| 3,436,276 | 4/1969 | Thompson | 148/9.5 |
| 3,455,747 | 7/1969 | Lytle | 148/9.5 |

FOREIGN PATENT DOCUMENTS

1,457,438  12/1976  United Kingdom.

*Primary Examiner*—W. Stallard
*Attorney, Agent, or Firm*—Warrick E. Lee, Jr.

[57] ABSTRACT

A thermochemical scarfing process and apparatus capable of reducing the amount of smoke discharged to the atmosphere and/or of preventing the formation of "secondary" fins when spot scarfing, comprising:

(a) scarfing oxygen is directed against a reaction zone of molten metal on the surface of the workpiece to produce a scarfing reaction, and (b) relative movement is provided between the oxygen stream and the workpiece, said reaction forming a molten puddle in front of the reaction zone that grows larger as the cut progresses, wherein the improvement comprises:

(c) directing at least one stream of non-reactive fluid to form a fluid, sheet-like curtain that provides a cover over the reaction zone and at least the rear portion of the molten puddle in such manner that said curtain forms a pocket with the surface of the workpiece.

24 Claims, 14 Drawing Figures

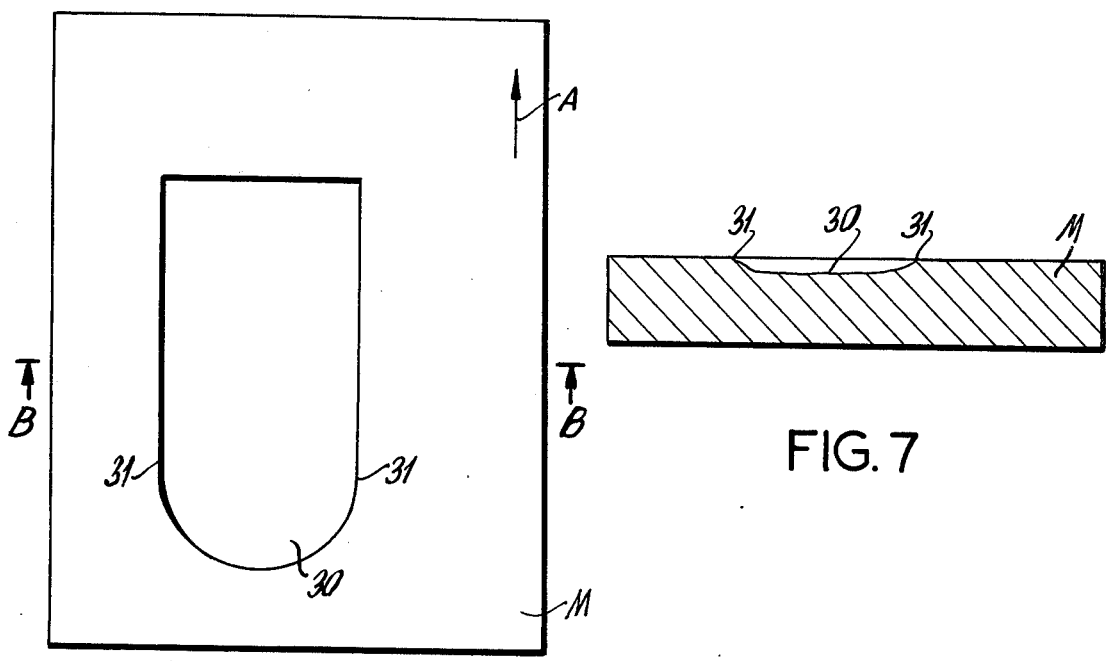
FIG. 6
FIG. 7
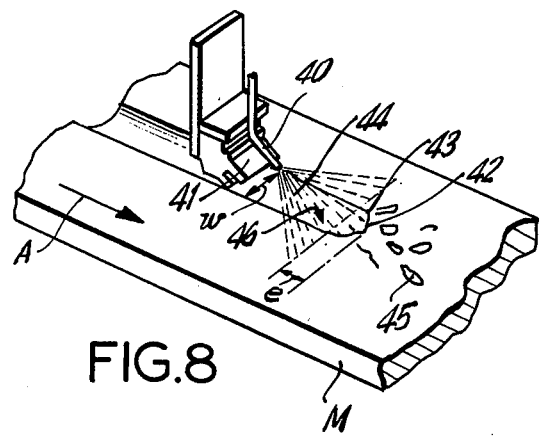
FIG. 8
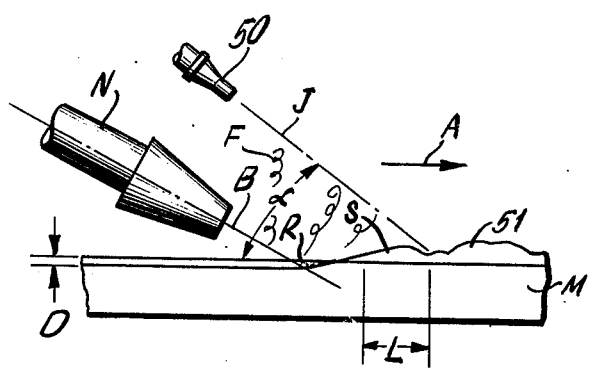
FIG. 9

METHOD AND APPARATUS FOR REDUCING SMOKE AND PREVENTING SECONDARY FINS DURING SCARFING

This application is a continuation-in-part of my U.S. application Ser. No. 608,987, filed Aug. 29, 1975, now abandoned.

BACKGROUND

This invention relates to the thermochemical desurfacing of metal bodies, commonly called scarfing. More particularly, this invention comprises a method and apparatus for preventing fin formation along the boundaries of a scarfing cut, and for substantially reducing the amount of smoke discharged into the atmosphere during scarfing.

The common practice in scarfing is to first form a molten metal puddle or "hot spot" on the surface of the workpiece by directing preheat flames at a relatively small area of the surface until it reaches its ignition temperature. Thereafter, a stream of oxygen is directed obliquely against the molten puddle to produce a thermochemical reaction on the metal surface. Relative movement is then produced between the oxygen stream and the workpiece which continues the thermochemical reaction along the metal surface, thereby producing the desired desurfacing along the length of the metal body. During the scarfing reaction, a puddle of molten slag, formed downstream of the scarfing reaction zone, continually precedes the advancing reaction zone along the work surface. This slag puddle preheats the metal surface before it is raised to its ignition temperature by the scarfing oxygen stream. Thus, the oxygen stream has a two-fold purpose: first, to effectuate the thermochemical reaction with the metal, and second, to continually push the molten puddle of metal and slag forward to expose fresh metal for the scarfing reaction.

There are two seemingly unrelated problems associated with conventional scarfing: (1) formation of fins when less than the full surface of the workpiece is scarfed and (2) formation of smoke, regardless of whether the full surface or less than the full surface is scarfed. Surprisingly, the preferred embodiment of the present invention is of substantial benefit minimizing the adverse effects of both of these problems, each of which will be discussed separately.

One problem associated with scarfing less than the full width of a metal surface, a process commonly referred to as "spot scarfing", is the formation of "fins" at the edge of the scarfing pass. The term "fin" as used herein refers to a thin flash or wash of pure or slightly oxidized base metal which is solidly joined to the surface of the metal workpiece at the boundary of a scarfing cut; the fins being undesirable defects on the metal body which must be removed before rolling. Fins may be produced by either or both of two unrelated causes. Fins may be produced directly from the primary reaction zone if molten metal is driven laterally out of said zone by the force of the scarfing oxygen stream, causing the molten metal to adhere to the edge of the scarfing cut where it solidifies in place. This type of fin formation (referred to herein, for purposes of convenience, as "primary" fins) can be prevented by using a specially shaped discharge orifice for the scarfing oxygen stream which gradually diminishes the intensity of the oxygen stream at the ends of the orifice to the point where the stream cannot sustain a scarfing reaction along the boundaries of the scarfing cut, but can oxidize molten metal at such boundaries before it solidifies. Nozzles having orifices of the special type described above that are particularly suited for spot scarfing in individual and gang arrangement are described in my U.S. applications Ser. No. 607,888, filed Aug. 26, 1975 and Ser. No. 607,887, filed Aug. 26, 1975 which were copending with my parent application and are now, respectively, U.S. Pat. Nos. 4,040,871 and 4,013,486, the disclosures of which are incorporated herein by reference.

Fins may also be formed by a so-called "secondary" effect which arises when the molten puddle of slag grows progressively larger ahead of the primary reaction zone to the point where the advancing oxygen stream can no longer move the entire puddle forward, and therefor pushes only the center portion of the puddle forward, thereby forcing some of the molten metal at the edges of the puddle laterally beyond the boundaries of the scarfing cut where it solidifies in an unoxidized state. One problem with which the present disclosure is concerned is a method and apparatus for preventing such "secondary" fin formation.

The use of fluid streams to help remove the slag produced by the scarfing reaction is well known. Thus, for example, U.S. Pat. Nos. 2,873,224 and 3,163,559 to Thompson et al. disclose, respectively, solid and hollow streams of high pressure water directed transversely to skim across the work surface just ahead of the scarfing reaction zone to wash away the slag. U.S. Pat. No. 3,354,002 to Gingerich et al. discloses a plurality of high velocity water jets positioned slightly downstream of the reaction zone, perpendicular to the direction of travel of the scarfing reaction, to trap the slag spray and to wash it off the work surface into a slag chute. While the use of such water jets, positioned transverse to the work surface, commonly referred to as "crossfire, slag-water" jets, is effective for removing slag from the surface of the metal, it is nevertheless incapable of preventing fins. This is due primarily to the fact that crossfire slag-water jets are positioned on one side of the workpiece to blow molten slag from the near side of the cut into a slag receptacle located along the opposite side of the workpiece. This has the effect of minimizing fin-formation on the near side of the cut, while tending to aggravate the problem of fin-formation on the far side.

The second problem caused by conventional scarfing operations is the large amount of smoke, i.e., fumes or vapors and fine particulate matter formed by the scarfing reaction. Prior art techniques for the collection and removal of smoke from the vicinity of the scarfing reaction zone are relatively cumbersome, requiring an inordinate amount of auxiliary cleaning equipment. In scarfing machine installations where the workpiece moves past a stationary machine, the smoke is normally collected in large stationary hoods and removed through ducts maintained under negative pressure by fans. The trapped smoke is thereafter sent through scrubbers and precipitators for removal of contaminants prior to being vented to the atmosphere. In installations where the scarfing machine moves past a stationary workpiece, traveling ducts are used in place of a stationary smoke hood to collect the smoke. In both cases, however, the equipment required for collecting and cleaning the smoke is relatively large, expensive and difficult to maintain.

In addition to preventing secondary fins and reducing the amount of smoke emitted to the atmosphere, the present invention produces a third beneficial result, namely reduction of noise. It is also apparent from comparing scarfing operations with and without the practice of this invention, that practice of the invention reduces the amount of noise emanating from the scarfing reaction.

OBJECTS

Accordingly, it is an object of the present invention to provide a method and apparatus for spot scarfing the surface of a metal workpiece in such manner as to prevent the formation of "secondary" fins along the boundaries of spot scarfing cuts.

It is still another object of the present invention to provide a scarfing method and apparatus which substantially reduces the amount of smoke that escapes into the atmosphere from the scarfing reaction.

It is a further object of the present invention to provide a method and apparatus for spot scarfing the surface of a metal workpiece in such manner as to prevent the formation of "secondary" fins along the boundaries of the scarfing cut and at the same time substantially reducing the amount of smoke that escapes into the atmosphere from the scarfing reaction.

SUMMARY OF THE INVENTION

These and other objects, which will become apparent from the detailed disclosure and claims to follow, are achieved by the present invention, one aspect of which comprises:

A thermochemical scarfing process wherein (a) a stream of scarfing oxygen is directed against a reaction zone of molten metal on the surface of a metal workpiece to produce a thermochemical reaction thereon and (b) relative movement is provided between the oxygen stream and the workpiece to continue the reaction along the length of metal surface to produce the desired scarfing cut, said reaction forming a molten puddle in front of the advancing reaction zone that tends to grow larger as the cut progresses, wherein the improvement comprises:

(c) directing at least one stream of non-reactive fluid so as to form a fluid sheet-like curtain that provides a cover over the reaction zone and at least the rear portion of the molten puddle in such manner that said fluid curtain forms a pocket with the surface of the workpiece.

Although the fluid curtain may intersect the work surface directly to form the pocket, it may also form the pocket indirectly by having the leading edge of the curtain intersect one of the cross-fire slag-water jets, i.e., one of the streams of water directed perpendicular to the direction of the scarfing pass which skim the work surface just ahead of the scarfing puddle.

The fluid curtain may be directed either from above and in substantially the same direction as the oxygen stream, and down at an oblique angle to the work surface, or it may be directed at an oblique angle to the work surface from the side of and substantially perpendicular to the oxygen stream. In either case, the curtain will intercept the smoke emanating from the scarfing reaction, thereby substantially reducing the amount of smoke emitted to the surrounding atmosphere.

If the stream or streams forming the fluid curtain are directed down from above the oxygen stream and in substantially the same direction as the oxygen stream so that the stream impinges upon the molten puddle across its entire width, and at a sufficient distance upstream of the leading edge of said puddle with sufficient intensity that the leading portion of said puddle is granulated and pushed forward in the direction of the scarfing path, it will keep the puddle sufficiently small to be readily pushed forward by the scarfing oxygen stream without deflecting a portion of the puddle laterally beyond the boundaries of the scarfing cut. By so doing, the formation of "secondary" fins will be prevented.

Another aspect of the present invention comprises:

Apparatus for scarfing the surface of a metal body comprising in combination: (a) means for discharging a stream of oxygen and directing it against a reaction zone of molten metal on the surface of said metal body to produce a thermochemical reaction thereon, and (b) means for producing relative movement between the workpiece and said means for discharging oxygen, wherein the improvement comprises:

(c) means for discharging at least one stream of non-reactive fluid such that it forms a sheet-like curtain directed to form a cover over the reaction zone and at least the rear portion of the molten puddle in such a manner that said fluid curtain forms a pocket with the surface of the workpiece, said means being capable of preventing the formation of secondary fins along the boundaries of a spot scarfing cut and/or of substantially reducing the amount of smoke produced by a scarfing reaction from being discharged into the atmosphere.

A preferred embodiment of the apparatus includes cross-fire, slag-water jets. In such case, the nozzles forming the fluid curtain are directed such that the leading edge of the curtain intersect one of the cross-fire, slag-water jets.

Said nozzle means may be directed either from above the means for directing said oxygen stream, down at an oblique angle to the work surface in substantially the same direction as the oxygen stream or said nozzle means may be directed from the side of the means for directing said oxygen stream, at an oblique angle to the work surface and substantially perpendicular to the oxygen stream. In either case the curtain will intersept vapors and particulate matter emanating from the scarfing reaction, thereby causing substantial reduction in the amount of smoke emitted to the surrounding atmosphere.

If the nozzle means for forming the curtain are directed down from above the oxygen stream and in substantially the same direction as the oxygen stream at an oblique angle to the work surface, so that the stream impinges upon the molten puddle across its entire width and at a sufficient distance upstream of the leading edge of said puddle with sufficient intensity that the leading portion of said puddle is granulated and pushed forward in the direction of the scarfing path by said fluid stream, it will keep the puddle sufficiently small to be readily pushed forward along the metal surface by the scarfing oxygen stream without deflecting a portion of the puddle laterally beyond the boundaries of the scarfing cut. By so doing, the formation of secondary fins will be prevented.

The term "non-reactive fluid" as used throughout the specification and claims is intended to mean a fluid that will not react rapidly with the metal workpiece. Water is the preferred non-reactive fluid for accomplishing both objectives, i.e., secondary fin prevention and smoke-control. However, other useful non-reactive fluids include, for example: steam, water mist (i.e., a mixture of water and air), or mixtures of water and an inert gas such as nitrogen or argon.

IN THE DRAWINGS

FIGS. 6 and 7 are top and cross-sectional views, respectively illustrating a steel slab which has been spot scarfed in accordance with the present invention, i.e., which produces a cut free of secondary fins as well as primary fins.

FIG. 8 is a perspective view illustrating a preferred embodiment of the present invention, how a metal slab may be spot scarfed to produce a fin-free cut, while the amount of smoke emitted to the atmosphere is simultaneously reduced.

FIG. 9 is a side view of the invention, illustrating the relative orientation of the water stream and the oxygen stream to obtain both smoke reduction and eliminating secondary fins.

DETAILED DESCRIPTION OF THE INVENTION

The present invention is predicated in part on the discovery that "secondary" fins can be prevented from forming along the edges of a scarfing cut by directing a stream of non-reactive fluid at the workpiece to effectively control the size of the molten puddle in front of the reaction zone. A stream of fluid striking the molten puddle upstream, or behind its leading edge, maintains the puddle size below the limit beyond which the puddle can no longer be pushed forward along the surface of the metal by the scarfing oxygen stream without deflecting portions of said puddle beyond the scarfing cut boundaries. The term "upstream" is used with reference to the stream of scarfing oxygen. Hence, "upstream" means toward the scarfing nozzle. The permissible puddle length may vary, depending upon the scarfing oxygen pressure, scarfing speed and depth of cut. For a spot scarfing operation on cold steel, a stream of fluid striking the slag puddle at a distance of about 35 cm in front of the reaction zone has proven effective for secondary fin prevention. For fin control the fluid stream is preferably a water jet at a pressure of at least 8.8 kg/cm$^2$ (gage) positioned above the scarfing oxygen stream to strike the slag puddle at an angle of about 45° relative to the work surface and directed in the direction of the oxygen stream. The angle of inclination of the water stream and its location relative to the puddle may, however, vary widely provided it granulates the leading portion of the slag puddle and moves it in the same direction as the advancing scarfing reaction zone. Thus, the angle between the fluid stream and the workpiece may vary from 20° to 80° and still be effective for fin prevention.

It has also been discovered that a fluid curtain which covers the reaction zone and at least the rear portion of the molten puddle so that the curtain forms a pocket with the work surface or the cross-fire slag removal jets serves as a barrier and absorbs large quantities of the smoke formed by the scarfing reaction. The liquid stream "scrubs" the undesired vapors and particulate matter, preventing their escape into the atmosphere surrounding the scarfing reaction. As a result, the undesired contaminants in the smoke are concentrated in a fluid stream which can be purified with far less effort and expense than purification of relatively large volumes of air containing the contaminants in dilute form.

Figure 1:
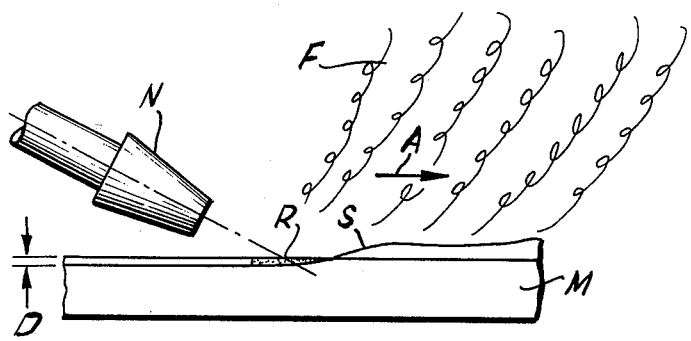
FIG. 1 is a schematic illustration, in side view, of a conventional spot scarfing cut in which the molten metal and slag puddle has been formed.
Figure 2:
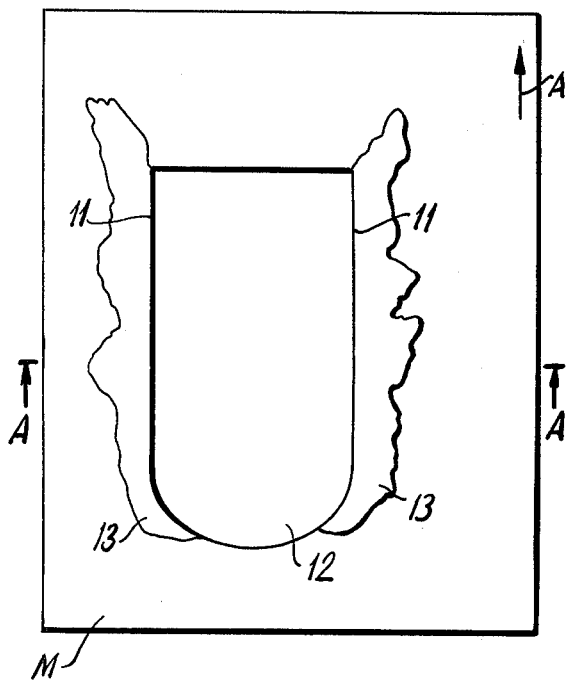
FIGS. 2 and 3 are top and cross-sectional views, respectively illustrating a steel slab which has been spot scarfed with a conventional nozzle producing fins.
Figure 3:
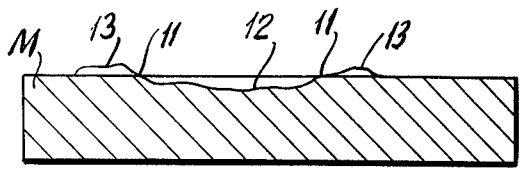
Figure 13:
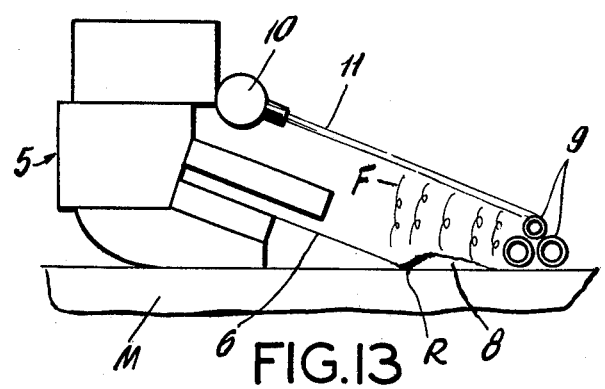
FIG. 13 is a side view of the present invention illustrating how the pocket for smoke control can be formed by directing the fluid curtain in the direction of the oxygen stream so as to intersect the cross-fire slag-water jets.
Figure 14:
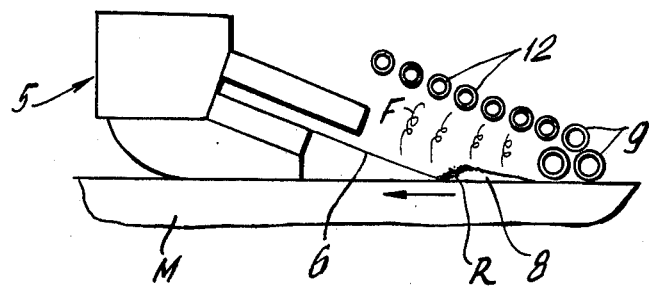
FIG. 14 is a side view of the present invention illustrating how the pocket for smoke control can be formed by directing the fluid curtain perpendicular to the oxygen stream so as to intersect the cross-fire slag-water jets.

Referring to FIG. 1, a single spot scarfing nozzle N is shown producing a cut in the direction shown by arrow A of depth D on workpiece M. The zone of primary reaction R is produced between the cutting oxygen stream discharged from scarfing nozzle N and the workpiece M. During a typical scarfing pass, volatile by-products of the scarfing reaction (i.e., smoke F) is discharged from the reaction zone R as well as from the rearward portion of the slag puddle S. The forward portion of puddle S is cooler and forms less smoke. In addition, the forward portion is generally removed by cross-fire water jets 9 (as shown in FIGS. 13 and 14). Some molten material from puddle S is blown out of reaction zone R to the edge of the scarfing cut. If nozzle N is a conventional round or rectangularly shaped nozzle, the melt thus blown aside would subsequently resolidify, adhering to the workpiece M, as shown in FIGS. 2 and 3, along the boundaries 11 of scarfing cut 12 to form fins 13. In addition to being formed from metal blown out of the primary reaction zone, fins 13 are formed independently from a second source, namely from a portion of the molten slag puddle S in front of the reaction zone; the fins formed from the latter being referred to herein as "secondary" fins. In all cases, fins 13 must be removed before the metal body is subsequently rolled.

Figure 4:
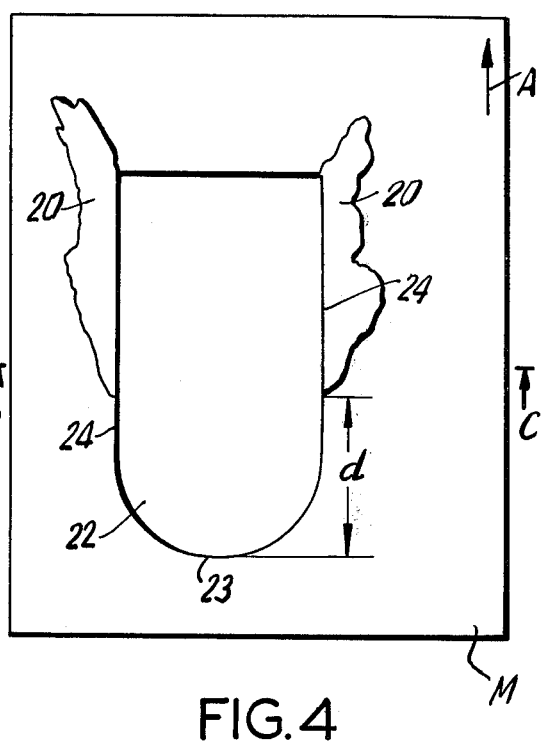
FIGS. 4 and 5 are top and cross-sectional views, respectively illustrating a steel slab which has been spot scarfed by nozzle means capable of preventing primary fin-formation, but incapable of preventing secondary fin-formation along the boundaries of the cut.
Figure 5:
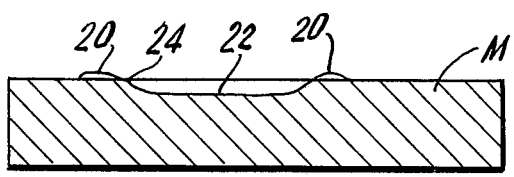

FIGS. 4 and 5 illustrate how secondary fins 20 form on the surface of a workpiece M during spot scarfing in the direction shown by arrow A, when a specially shaped nozzle only capable of preventing the formation of primary fins is used. The resulting scarfing cut 22 is fin-free for a distance "d" from the start or front edge 23 of the cut, while the remainder of the cut is characterized by secondary fins 20 along the boundaries of the cut 24. The partially fin-free cut 22 reflects the fact that the molten slag puddle was readily pushed forward along the work surface for a distance "d" by the stream of scarfing oxygen emanating from the scarfing oxygen nozzle and primary fin formation was prevented by the specially shaped nozzle. However, when the size of the puddle in front of the advancing reaction zone becomes unduly large, portions of the puddle are deflected to the sides of the cut by the scarfing oxygen stream forming the secondary fins.

FIGS. 6 and 7 illustrate the smoothly contoured cut 30, fin-free along boundaries 31, produced when workpiece M is spot scarfed using the specially shapped nozzles referred to above and in accordance with the invention wherein the formation of secondary as well as primary fins has been prevented.

FIG. 8 shows a spot scarfing pass in progress wherein a single water nozzle 40, located above scarfing unit 41, is shown directing a high pressure stream of water which fans out to produce a water curtain 44 that strikes the slag puddle 46 at a distance e upstream or behind the leading edge 42 of the puddle. The leading portion 43 of the puddle is cooled and granulated by the water curtain 44, and the granulated slag 45 is swept forward in substantially the direction of the scarfing path shown by arrow A. To reduce the amount of smoke that enters the atmosphere from the scarfing reaction, the water curtain 44 must have a width at least equal to that of the reaction zone as it passes above it. Note that the inclined water curtain 44 forms a pocket with the workpiece M that traps the rising smoke by absorbing it.

For purposes of secondary fin prevention, the stream of water 44 must be at least the width W of the molten puddle when it strikes the puddle to insure that the leading portion of the puddle 43 is granulated across its entire width and swept forward by the high pressure water curtain 44. The remainder of the puddle 46 is thereby maintained small enough to be moved forward by the oxygen stream, but large enough to still provide sufficient preheating of the workpiece M. In order to prevent primary fin formation, as well as secondary fin formation, the scarfing oxygen unit 41 must be of the specially-shaped type described in my copending U.S. application Ser. No. 607,888, now U.S. Pat. No. 4,040,871 if an individual fin-free cut is to be made; or of the specially-shaped type described in my copending U.S. application Ser. No. 607,887, now U.S. Pat. No. 4,013,486, if a plurality of side-by-side cuts is to be made.

Although a single water nozzle 40 which fans out is shown in FIG. 8, it will be apparent to those skilled in the art that a plurality of such nozzles or a wide slot type of nozzle could be used in its place. A plurality of nozzles would be preferred if more complete smoke control were necessary or desirable to produce a fluid curtain that more completely blanketed the area above the smoke producing reaction zone, that is the primary reaction zone and the hot, back end of the molten slag puddle.

FIG. 9 is a side-view of apparatus similar to that shown in FIG. 8, except that a single nozzle scarfing oxygen torch N is used in place of a scarfing unit 41. Nozzle N directs a stream of scarfing oxygen B, in the direction of the axis of nozzle N, at workpiece M to form the scarfing reaction zone R. D represents the depth of the cut and arrow A the direction in which the scarfing cut progresses. Water curtain J discharged from water nozzle 50 strikes slag puddle S a distance L ahead of reaction zone R at an angle α relative to the workpiece M. Note that the water curtain J does not and must not impinge on the reaction zone R since to do so would interfere with the scarfing reaction and could kill it completely.

In accordance with the present invention, smoke control and secondary fin prevention may both be achieved utilizing apparatus illustrated in FIGS. 8 or 9 by using the following preferred operating conditions for scarfing cold steel traveling at about 9 meters/minute to a depth of about 3/16″. In such case the distance L should be about 35 cm, and the angle α formed by the water stream J and the surface of the workpiece should be between 30° and 45°. The gage pressure of the fluid should be from about 8 kg/cm² to about 11 kg/cm². The preferred fluid is water. The puddle S is prevented from growing larger than length L, a size which the scarfing oxygen stream B is able to move forward, since that portion of puddle 51 which would normally form ahead of the water stream J is granulated and swept forward and away from the scarfing cut. Like the apparatus shown in FIG. 8, the apparatus of FIG. 9 may also be used in combination with means for preventing the formation of primary fins. In order to do so, it is necessary to use as the nozzle N, a special nozzle which prevents the formation of primary fins, such as described in previously referred to U.S. applications Ser. Nos. 607,888 or 607,887, now U.S. Pat. Nos. 4,040,871 and 4,013,486.

It will be apparent that the water curtain J will not only prevent the formation of secondary fins, but by covering the area over the reaction zone from which smoke is emitted, it will also act as a smoke absorbing curtain since the smoke tends to travel upwards and is thus trapped by the water curtain J. The smoke is composed of iron oxide fumes, vaporized metal, fine particles of slag and the like.

Figure 10:
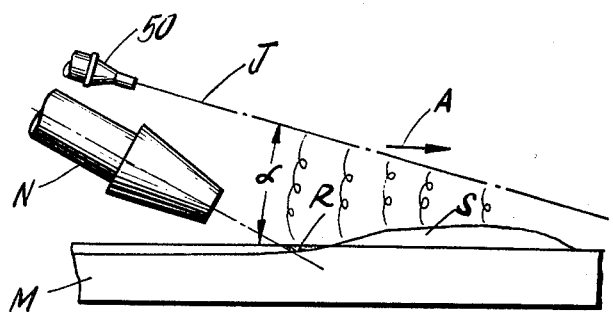
FIG. 10 is a side view of the invention, illustrating a fluid curtain that will reduce the amount of smoke emitted to the atmosphere, but will not necessarily prevent secondary fins.

FIG. 10 illustrates the effect of directing the water stream J further upstream so that it intersects the workpiece M ahead of the slag puddle S. Here, the water curtain formed by stream J will reduce the amount of smoke discharged to atmosphere, but will not prevent the formation of secondary fins, since the water curtain jet J does not impinge upon scarfing puddle S, so that prevention of secondary fins by keeping the size of the puddle small is not accomplished. However, as long as the fluid curtain passes over the reaction zone, at a width at least equal to that of the reaction zone, the amount of smoke emitted to the atmosphere will be substantially reduced. The angle α as previously defined, can vary from 0° to 60° and still be effective for smoke control, with an angle of 30° being preferred. The water pressure may vary from about 3 kg/cm² gage to as high as practical. Air-water mixtures can be used at lower pressure because the air tends to atomize the water, producing finer mists of water over the reaction zone. Steam or mixtures of an inert gas such as nitrogen or argon with water will also effectively trap the smoke. The fluid containing the trapped smoke is ordinarily collected together with the water from the cross-fire, slag-jets, in a drainage system under the workpiece from whence it is piped to a water treatment system.

Figure 11:
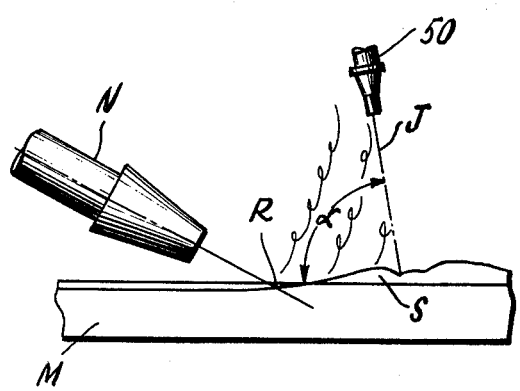
FIG. 11 is a side view of the invention illustrating a fluid stream that is useful for preventing the formation of secondary fins, but not the reduction of smoke emitted to the atmosphere.

FIG. 11 is a side view of an embodiment of the invention that will prevent secondary fins, but will not substantially reduce the amount of smoke discharged to the atmosphere. Here, water nozzle 50 is positioned such that the fluid stream does not pass over the reaction zone R, thereby failing to accomplish effective smoke control. However, since the water stream J impinges on the puddle S along its entire width, at a sufficient distance upstream of its leading portion to granulate and push forward the leading portion of the puddle, prevention of secondary fins is accomplished. For preventing secondary fins, the angle α can vary from about 20° to about 80° with 45° being preferred. A fluid pressure of at least 8 kg/cm² gage is preferred.

Figure 12:
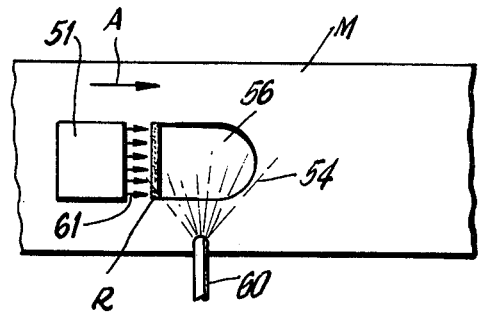
FIG. 12 is a top view of another embodiment of the invention illustrating a fluid curtain directed from the side of the workpiece perpendicular to the oxygen stream that will reduce the amount of smoke emitted to the atmosphere, but will not prevent secondary fins.

FIG. 12 illustrates an alternative embodiment for practicing the present invention, one that is capable of substantially reducing the amount of smoke emitted to the atmosphere, but not of preventing secondary fins. Scarfing unit 51 is shown making a spot scarfing cut on workpiece M. Arrow A indicates the direction of the scarfing cut or path. Water nozzle 60 fans out to produce a sheet-like stream of water 54, wide enough to blanket the entire molten puddle 56 and reaction zone R. Although the preferred method of directing the fluid stream is from above the scarfing oxygen stream down at an oblique angle to the workpiece and in substantially the same direction as the scarfing oxygen stream, the fluid may originate from either side of the workpiece as shown in FIG. 12, as long as it forms a curtain that covers the reaction zone R and at least the rear portion of molten puddle 56 so as to form a pocket with the work surface that intercepts the smoke emanating the scarfing reaction. In FIG. 12, fluid stream 54 is directed from the right side of the oxygen stream 61 and perpendicular to the direction of the scarfing oxygen stream 61. Although for purposes of illustration only one water nozzle 60 is shown, a plurality of nozzles may be used.

FIG. 13 illustrates how the pocket for trapping the smoke may be formed by combining the sheet-like fluid curtain 11 with cross-fire, slag-water jets 9. Such jets are described in greater detail in, for example, U.S. Pat. Nos. 2,465,297, 3,163,559 and 3,354,002. Scarfing unit 5 is one of several such units (only one of which is shown) in abutting relationship for scarfing the entire surface of the workpiece. In such cases, formation of fins along the edges of the scarfing cut is not a problem. In FIG. 13, the scarfing units 5 direct a sheet-like stream of scarfing oxygen 6 at the surface of the metal workpiece M to produce the thermochemical reaction. A molten slag puddle 8 is formed in front of the reaction zone R. The three cross-fire, slag-water jets 9 which skim the surface of the workpiece M are used to granulate, trap and remove the slag. A header 10 is used to discharge a fluid curtain 11 over the top of the reaction zone R. The leading edge of curtain 11 intersects the cross-fire, slag-water jets 9 to form the pocket for trapping the smoke.

FIG. 14 illustrates an alternative embodiment of the invention. It is similar in function to that shown in FIG. 13 except that the fluid curtain is formed by a plurality of streams directed by nozzles 12 from the side of the workpiece M perpendicular to the direction of the oxygen stream are located in a plane inclined down from above the scarfing oxygen stream toward the workpiece M. The leading edge of the fluid curtain intersects one of the three cross-fire, slag-jets 9 to form the pocket for trapping the smoke F.

Although the drawings all illustrate the fluid curtain of this invention as a flat plane, it will be apparent to those skilled in the art, that it can have any shape that fulfills its function requirements. The curtain could, for example, be curved down to the work surface to prevent even the small amounts of smoke that normally escape at the open sides of a planar curtain, (such as illustrated in FIGS. 10 and 13) from escaping. Alternatively, the curtain could be formed of several, for example, three planar streams, i.e., one over the top and one on each side of the reaction zone and slag puddle.

If smoke control is sought to be achieved on a four sided scarfing machine, such as shown in U.S. Pat. No. 2,465,297, where a scarfing reaction takes place on all four sides of the workpiece, a fluid curtain would be required on each of the four sides to trap the smoke. For optimum smoke reduction, the entire circumferential area surrounding the workpiece should be enclosed by a water curtain. This could be accomplished by a one-piece, i.e., frusto-conically shaped curtain or by a plurality of individual curtains surrounding all four sides of the workpiece. Less complete but adequate smoke reduction can be achieved by having a planar fluid curtain on each side of the work surface being scarfed. If only two surfaces are being scarfed, say top and one side, then only those two surfaces require a fluid curtain.

What is claimed is:

1. In a thermochemical scarfing process wherein (a) a stream of scarfing oxygen is directed against a reaction zone of molten metal on the surface of the metal workpiece to produce a thermochemical reaction thereon, and (b) relative movement is provided between the oxygen stream and the workpiece to continue the reaction along the metal surface to produce the desired scarfing cut, said reaction forming a molten puddle in front of the advancing reaction zone that tends to grow larger as the cut progresses, the improvement comprising:
(c) directing at least one stream of non-reactive fluid so as to form a fluid sheet-like curtain that provides a cover over the reaction zone and at least the rear portion of the molten puddle in such manner that said curtain forms a pocket with the surface of the workpiece.

2. The process of claim 1 wherein said stream is directed from above and in substantially the same direction as the oxygen stream and down at an oblique angle to the work surface, whereby said curtain intercepts the smoke emanating from the scarfing reaction and thereby substantially reduces the amount of smoke discharged to the surrounding atmosphere.

3. The process of claim 1 wherein said stream is directed from the side of and substantially perpendicular to the oxygen stream, and at an oblique angle to the work surface, whereby said curtain intercepts the smoke emanating from the scarfing reaction and thereby substantially reduces the amount of smoke discharged to the surrounding atmosphere.

4. The process of claim 2 wherein the leading edge of said fluid curtain intersects a jet of water directed substantially perpendicular to the direction of the scarfing cut to skim across the work surface ahead of the scarfing puddle.

5. The process of claim 3 wherein the leading edge of said fluid curtain intersects a jet of water directed substantially perpendicular to the direction of the scarfing cut to skim across the work surface ahead of the scarfing puddle.

6. The process of claim 1 wherein the non-reactive fluid is water.

7. The process of claim 1 wherein the non-reactive fluid is a gas-water mixture.

8. The process of claim 1 wherein the non-reactive fluid is steam.

9. The process of claim 1 wherein said stream is directed from above and in substantially the same direction as the oxygen stream, and down at an oblique angle to the work surface, so as to impinge said stream upon said puddle across its entire width, at a sufficient distance upstream of the leading edge of said puddle and with sufficient intensity that the leading portion of said puddle is granulated and pushed forward in the direction of the scarfing path by said fluid stream to keep the puddle sufficiently small that the scarfing oxygen stream can readily push it forward along the metal surface without deflecting the puddle laterally beyond the boundaries of the scarfing cut, thereby preventing the formation of secondary fins.

10. The process of claim 9 wherein the non-reactive fluid is water.

11. The process of claim 9 wherein the non-reactive fluid is a gas-water mixture.

12. The process of claim 9 wherein the non-reactive fluid is steam.

13. In apparatus for scarfing the surface of a metal body comprising in combination: (a) means for discharging a stream of oxygen and directing it against a reaction zone of molten metal on the surface of said metal body to produce a thermochemical reaction thereon, and (b) means for producing relative movement between the workpiece and said means for discharging oxygen, the improvement comprising:
(c) means for discharging at least one stream of non-reactive fluid such that it forms a sheet-like curtain directed to form a cover over the reaction zone and at least the rear portion of the molten puddle such that said fluid curtain forms a pocket with the surface of the workpiece.

14. The apparatus of claim 13 wherein said means for discharging said fluid curtain is directed from above and in substantially the same direction as the axis of said means for discharging oxygen, and directed down at an oblique angle to the work surface, thereby rendering said fluid curtain capable of intercepting smoke emanating from the scarfing reaction and substantially reducing the amount of smoke discharged to the surrounding atmosphere.

15. The apparatus of claim 13 wherein said means for discharging said fluid curtain is directed at an oblique angle to the work surface, from the side of and substantially perpendicular to the axis of said means for discharging oxygen, thereby rendering said fluid curtain capable of intercepting smoke emanating from the scarfing reaction and substantially reducing the amount of smoke discharged to the surrounding atmosphere.

16. The apparatus of claim 14 which includes means for directing a jet of water substantially perpendicular to the direction of the scarfing cut to skim across the work surface ahead of the scarfing puddle, and wherein said means for discharging said fluid curtain is directed to intersect said jet of water.

17. The apparatus of claim 15 which includes means for directing a jet of water substantially perpendicular to the direction of the scarfing cut to skim across the work surface ahead of the scarfing puddle, and wherein said means for discharging said fluid curtain is directed to intersect said jet of water.

18. The apparatus of claim 13 wherein said means for discharging said fluid curtain is directed from above and in substantially the same direction as the axis of said means for discharging oxygen, and directed down at an oblique angle to the work surface to impinge said stream upon said puddle across its entire width, at a sufficient distance upstream of the leading edge of said puddle and with sufficient intensity that the leading portion of said puddle is granulated and pushed forward in the direction of the scarfing path by said fluid stream to keep the puddle sufficiently small that the scarfing oxygen stream can readily push it forward along the metal surface without deflecting the puddle laterally beyond the boundaries of the scarfing cut, thereby preventing the formation of secondary fins.

19. In apparatus for scarfing the surface of a metal body comprising in combination: (a) means for discharging a stream of oxygen and directing it against a reaction zone of molten metal on the surface of said metal body to produce a thermochemical reaction thereon, the improvement comprising:
(b) means for discharging at least one stream of non-reactive fluid such that it forms a sheet-like curtain directed to form a cover over the reaction zone and at least the rear portion of the molten puddle such that said fluid curtain forms a pocket with the surface of the workpiece.

20. The apparatus of claim 19 wherein said means for discharging said fluid curtain is directed from above and in substantially the same direction as the axis of said means for discharging oxygen and directed down at an oblique angle to the work surface, thereby rendering said fluid curtain capable of intercepting smoke emanating from the scarfing reaction and substantially reducing the amount of smoke discharged to the surrounding atmosphere.

21. The apparatus of claim 19 wherein said means for discharging said stream fluid curtain is directed at an oblique angle to the work surface, from the side of and substantially perpendicular to the axis of said means for discharging oxygen, thereby rendering said fluid curtain capable of intercepting smoke emanating from the scarfing reaction and substantially reducing the amount of smoke discharged to the surrounding atmosphere.

22. The apparatus of claim 20 which includes means for directing a jet of water substantially perpendicular to the direction of the scarfing cut to skim across the work surface ahead of the scarfing puddle, and wherein said means for discharging said fluid curtain is directed to intersect said jet of water.

23. The apparatus of claim 21 which includes means for directing a jet of water substantially perpendicular to the direction of the scarfing cut to skim across the work surface ahead of the scarfing puddle, and wherein said means for discharging said fluid curtain is directed to intersect said jet of water.

24. The apparatus of claim 19 wherein said means for discharging said fluid curtain is directed from above and in substantially the same direction as the axis of said means for discharging oxygen, and directed down at an oblique angle to the work surface to impinge said stream upon said puddle across its entire width, at a sufficient distance upstream of the leading edge of said puddle and with sufficient intensity that the leading portion of said puddle is granulated and pushed forward in the direction of the scarfing path by said fluid stream to keep the puddle sufficiently small that the scarfing oxygen stream can readily push it forward along the metal surface without deflecting the puddle laterally beyond the boundaries of the scarfing cut, thereby preventing the formation of secondary fins.

* * * * *

UNITED STATES PATENT OFFICE
CERTIFICATE OF CORRECTION

Patent No. 4,120,703      Dated October 17, 1978

Inventor(s) Stephen August Engel

It is certified that error appears in the above-identified patent and that said Letters Patent are hereby corrected as shown below:

In col. 4, line 21, delete "a".

In col. 5, line 8, "producting" should read -- producing --.

In Col. 6, line 27, "contanimants" should read -- contaminants --.

In col. 9, line 53, after "stream" insert -- 6. Nozzles 12 --.

Signed and Sealed this

Thirteenth Day of March 1979

[SEAL]

Attest:

RUTH C. MASON
Attesting Officer

DONALD W. BANNER
Commissioner of Patents and Trademarks